Oct. 30, 1962 R. H. PRY 3,061,737

CRYOGENIC DEVICE WHEREIN PERSISTENT CURRENT LOOP INDUCED IN OUTER SUPERCONDUCTOR MAINTAINS INNER SUPERCONDUCTOR RESISTIVE

Filed Oct. 30, 1958

Inventor:
Robert H. Pry,
by Richard R. Brainard
His Attorney.

United States Patent Office 3,061,737
Patented Oct. 30, 1962

3,061,737

CRYOGENIC DEVICE WHEREIN PERSISTENT CURRENT LOOP INDUCED IN OUTER SUPERCONDUCTOR MAINTAINS INNER SUPERCONDUCTOR RESISTIVE

Robert H. Pry, Schenectady, N.Y., assignor to General Electric Company, a corporation of New York
Filed Oct. 30, 1958, Ser. No. 770,749
12 Claims. (Cl. 307—88.5)

Figure 1:
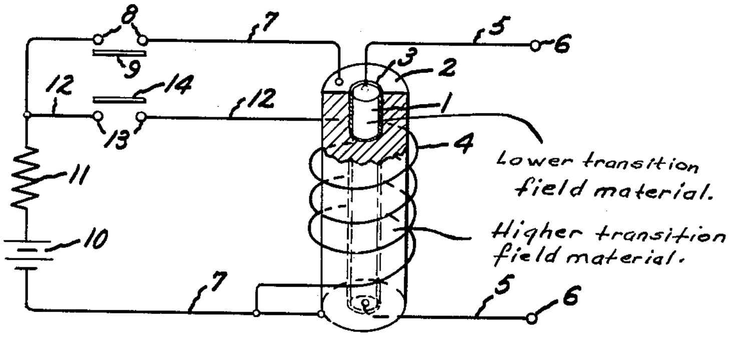

The present invention relates to an improved cryogenic electronic device and a bistable circuit in which two of these devices are the active elements.

At temperatures near absolute zero a number of metallic elements and alloys become superconducting, i.e., have zero resistance. Twenty-two metallic elements are known to have this property. When an increasing magnetic field is passed through any one of these superconducting materials, the resistance of the material suddenly increases from zero to the normal resistance at a field value termed the "transition field." This transition field is dependent upon the particular material and its temperature, as well as other factors.

Recently, this transition characteristic has been utilized in electronic elements that I prefer to call cryogenic electronic devices. One of these devices comprises a central superconducting wire of relatively low transition field placed inside a superconducting winding of higher transition field. When a current is conducted through the winding of sufficient magnitude to produce a magnetic field greater than the transition field of the central wire but less than the transition field of the winding, the resistance of the central wire switches from zero to normal resistance while the resistance of the winding remains zero.

These devices are often placed in parallel with a current source and a load. When the central wire is superconducting all of the current passes through it. But when it is resistive the current divides between it and the load.

When one of these prior art type cryogenic electronic devices is utilized as a relay or as the active element in a bistable circuit, a holding current is required in the winding to maintain the central wire in a resistive state. Due to this holding current requirement, a large number of these devices are needed for many systems in which cryogenic electronic devices are used.

Accordingly, an object of the present invention is to provide an improved cryogenic electronic device.

Another object is to provide a cryogenic electronic device which can be maintained resistive without an external current supply.

A further object is to provide an improved bistable cryogenic electronic device circuit.

These and other objects are achieved in a preferred cryogenic electronic device embodiment of my invention comprising two superconducting coaxial cylinders and a superconducting exterior winding. The inner cylinder is formed from low transition field material, the outer cylinder from medium transition field material, and the winding from high transition field material. A current pulse supplied to the winding produces a magnetic field greater than the transition fields of both the cylinders thereby causing them to become resistive. When this pulse terminates, the decaying magnetic field induces currents in the outer cylinder that, when the field decreases below the transition field of the outer cylinder, continue to flow indefinitely in the then superconducting outer cylinder. This current flow produces a magnetic field greater than the transition field of the inner cylinder that maintains the cylinder in a resistive state.

Figures 2, 3:
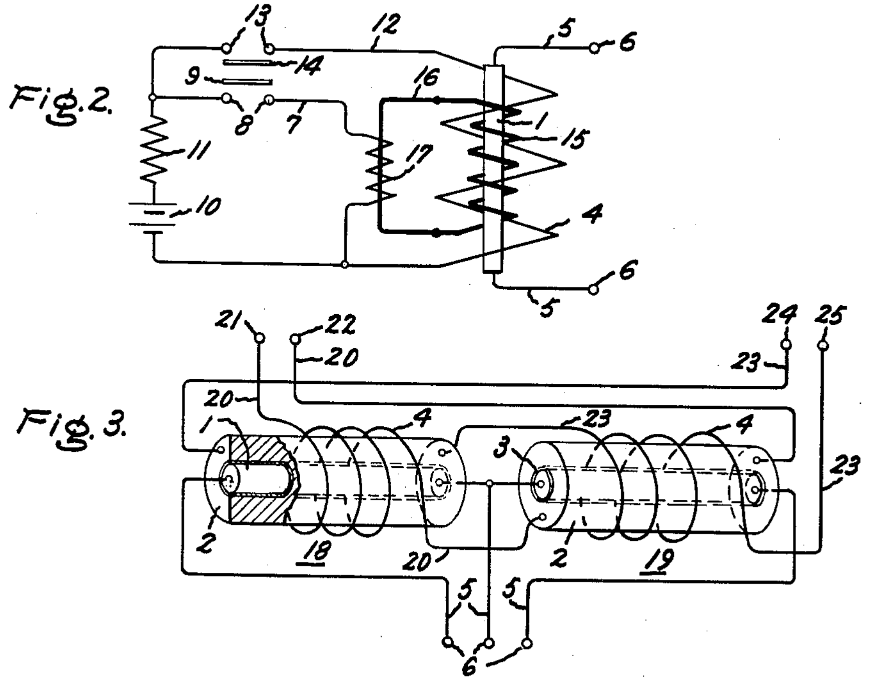
Figure 4:
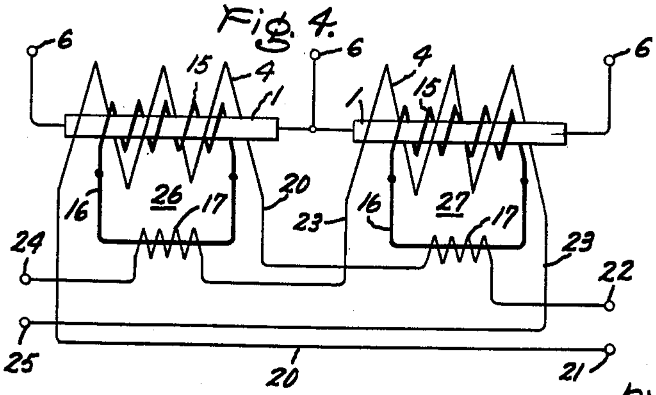

The novel features believed characteristic of the invention are set forth in the appended claims. The invention itself, however, together with further objects and advantages thereof may best be understood by reference to the following description, taken in connection with the accompanying drawing, in which;

FIG. 1 is a diagram of a circuit with a preferred cryogenic electronic device embodiment of my invention, FIG. 2 is a diagram of a circuit of another cryogenic electronic device embodying the features of my invention, FIG. 3 is a diagram of a bistable circuit in which two cryogenic electronic devices of the FIG. 1 embodiment type are the active elements, and FIG. 4 is a diagram of a bistable circuit in which two cryogenic electronic devices of the FIG. 2 embodiment type are the active elements.

In FIG. 1 I have illustrated a cryogenic electronic device of my invention comprising an inner cylinder 1 of superconducting material of low transition field surrounded by an exterior cylinder 2 of superconducting material of medium transition field and insulated therefrom by an insulating sleeve 3. An insulation covered winding 4 of high transition field is wound about cylinder 2.

Preferably, the transition fields between cylinders 1 and 2 and also between cylinder 2 and winding 4 differ by a factor of two or more, although the difference may be less. The control of the superconducting states of the individual components is less exacting when there are large differences in the transition fields. Cylinders 1 and 2 and winding 4 may be constructed from, for example, tin, lead, and niobium, respectively. At 3.5° K. the transition fields of these elements is approximately 30 oersteds, 600 oersteds, and 2,000 oersteds, respectively. One of the many other suitable combinations are tantalum, vanadium, and either lead or niobium. At 4.2° K. the transition fields of these materials is approximately 50 oersteds, 330 oersteds, 540 oersteds, and 2,000 oersteds, respectively.

Cylinder 1 is connected by leads 5 to terminals 6 to which a utilization circuit, not shown, may be connected. Cylinder 2 is connected by leads 7 through a switch, illustrated as two contacts 8 and an armature 9, in parallel with the series combination of a source 10 of direct current and a current limiting resistor 11. Winding 4 is connected to this series combination by leads 12, and also by some of the leads 7, through a switch, illustrated as two contacts 13 and an armature 14.

The cryogenic electronic device of FIG. 1 is maintained, by means not illustrated, at a very low temperature, which for presently known superconducting materials is in range of liquid helium or hydrogen temperatures. For example, this device may be submerged in liquid helium contained in a Dewar vessel that is surrounded by liquid nitrogen contained in a larger Dewar vessel. This low temperature arrangement is called a cryostat.

To initiate operation, all of the parts of the cryogenic electronic device are placed in a superconducting state. If the armature 14 is then momentarily closed against contacts 13 to complete the circuit from source 10 through winding 4, the axial magnetic field produced by the resulting current flow in winding 4 is of sufficient intensity to restore the resistance in cylinders 2 and 3. Upon termination of this current pulse, current flow is induced in cylinder 2 by the axial field, which then begins to decay. When the axial field decays below the transition field of cylinder 2 this current flow, which can continue indefinitely in the then superconducting cylinder 2, maintains the axial field at cylinder 1 at only slightly below the transition field of cylinder 2 and thus above the transition field of cylinder 1. Cylinder 1 may then remain in the resistive state indefinitely.

Cylinder 1 may be returned to the superconducting state if armature 9 is closed against contacts 8 to complete a current path from source 10 axially through cylinder 2. The concentric magnetic field pattern produced by the resulting current flow is sufficient in magnitude to revert cylinder 2 to the resistive state. When the circumferentially flowing currents are dissipating in the resistance of cylinder 2 the axial field decays to zero inside cylinder 1, which then reverts to the superconducting state. When armature 9 is separated from contacts 8, cylinder 2 reverts to the superconducting state due to the resulting decay of the concentric magnetic field.

This decaying concentric magnetic field does not induce currents in cylinder 2 or winding 4 because any induced currents from it would flow longitudinally in the device. And there are no closed circuits for current flow in this direction. No current flow is induced in cylinder 1 since this field does not pass through cylinder 1.

From the above explanation it should be evident that for the cryogenic electronic device to function, the winding 4 does not have to be formed from superconducting material. However, if it is superconducting, no energy is dissipated in winding 4. If winding 4 is resistive, the superconductivity of cylinder 2 can be destroyed by joule heat from current flow through winding 4 instead of by the magnetic field produced from a current flow through cylinder 2.

With this cryogenic electronic device a condition of zero or normal resistance can be created between terminals 6 and maintained indefinitely without holding current supplied from an external source.

If desired, a bundle of superconducting wires can be substituted for cylinder 1, each wire connected between a different pair of terminals 6. The device may then function as a multi-contact self-holding relay.

In FIG. 2 I have illustrated a cryogenic electronic device embodying features to which my invention is generic but specifically described and claimed in the copending application Ser. No. 770,750 of Volney C. Wilson, filed concurrently herewith. In this device an insulation covered winding 15 is wound on cylinder 1 either beneath, above, or with winding 4. The ends of winding 15 are interconnected by a lead 16 of superconducting material that may or may not be the same material from which winding 15 is formed. The particular transition field for lead 16 is not significant but for winding 15 should be greater than that of cylinder 1. A winding 17 is wound about lead 16 and connected to source 10 through armature 9 and contacts 8.

Initially, armatures 9 and 14 are separated from contacts 8 and 13 and the device is completely superconducting. The current flow through winding 4, obtained with the momentary closing of armature 14 against contacts 13, produces an axial magnetic field greater than the transition fields of winding 15 and cylinder 1 thereby causing resistance to be restored in these components. When this current flow is terminated the axial magnetic field, which in decaying permits winding 15 to revert to the superconductive state, induces in winding 15 a current flow that maintains the axial field only slightly less than the transition field of the material of winding 15. Thus, cylinder 1 remains resistive.

Cylinder 1 can be reverted to the superconducting state by closing armature 9 against contacts 8. This completes a circuit for current flow through winding 17 which then produces a magnetic field greater than the transition field of lead 16 thereby causing the portion of leads 16 adjacent winding 17 to become resistive. This resistive portion of lead 16 quickly dissipates the current in winding 15 producing the axial magnetic field. With the dissipation of the current, the axial magnetic field decays to zero.

In FIG. 3 I have illustrated a "flip-flop" circuit in which the active elements are two cryogenic electronic devices 18 and 19 of the FIG. 1 embodiment type. In this circuit the winding 4 of device 18, is connected by leads 20 in series with the outer cylinder 2 of device 19 across two terminals 21 and 22. The winding 4 of device 19 is connected in series by leads 23 with the outer cylinder 2 of device 18 across two terminals 24 and 25.

A finite resistance—the resistance of one of the cylinders 1—can be placed across the center terminal 6 and either the left or right terminal 6 by the application of current pulses to terminals 21, 22, or 24, 25. For example, with the inner cylinder 1 of device 18 initially resistive a finite resistance exists between the center and the left terminals 6 while zero resistance exists between the center and the right terminals 6. When a current pulse is applied to terminals 24 and 25, the resulting current flow destroys the superconductivity of cylinder 2 of device 18 and thereby reverts inner cylinder 1 of device 18 to a superconducting state. That is, the resistance of cylinder 2 of device 18 dissipates the circumferentially flowing currents therein that produce a magnetic field greater than the transition field for cylinder 1.

This same current pulse, which also flows through winding 4 of device 19, produces a magnetic field that restores the resistance of cylinder 1 of this device 19. Upon termination of this current pulse, the circumferentially flowing current induced in cylinder 2 of devices 19 maintains this resistance. Then resistance appears between the center and the right terminals 6 while there is zero resistance between the center and the left terminals 6.

The circuit can be returned to the original stable state by the application of a current pulse to terminals 21 and 22. The resulting current flow through cylinder 2 of device 19, which destroys the superconductivity of this cylinder 2, causes the dissipation of the superconducting current flow that was maintaining the cylinder 1 of device 19 in a resistive state. Consequently, this cylinder 1 reverts to the superconducting state. At the same time this current pulse produces a magnetic field, by passage through winding 4 of device 18, that restores the resistances of cylinders 1 and 2 of device 18. When this pulse terminates, the decaying field induces a circumferentially current flow in cylinder 2 of device 18 that maintains the axial magnetic field greater than the transition field for cylinder 1 of device 18.

In FIG. 4 I have illustrated a circuit diagram of a "flip-flop" circuit in which the active elements are two of the cryogenic electronic devices 26 and 27 of the FIG. 2 type. If the inner cylinder 1 of device 26 is initially resistive, current pulses applied to terminals 24 and 25 destroy the superconductivity of a portion of the lead 16 that connects the ends of winding 15 of device 26. The resistance of lead 16 quickly dissipates the circulating current in this winding 15 that is maintaining the inner cylinder 1 in the resistive state. The same current pulse, which passes through winding 4 of device 27, induces in winding 15 of device 27, by a process previously explained, a current that produces a field which maintains cylinder 1 of device 27 resistive. A pulse applied to terminals 21 and 22 similarly causes cylinder 1 of device 27 to revert to the superconducting state and cylinder 1 of device 26 to become resistive.

In summary, several embodiments of a cryogenic electronic device have been described which for bistable operation do not require holding currents from an external source. Instead, these devices provide their own holding currents. When utilized as the active elements in a bistable circuit, only two of these devices are required as compared to six prior type cryogenic electronic devices, when they are the active elements.

While the invention has been described with respect to certain specific embodiments, it will be appreciated that many modifications and changes may be made by those skilled in the art without departing from the spirit of the invention. I intend, therefore, by the appended claims, to cover all such modifications and changes as fall within the true spirit and scope of my invention.

What I claim as new and desire to secure by Letters Patent of the United States is:

1. A cryogenic electronic device comprising a first conductor of superconducting material having a first transition, field, a second conductor of superconducting material providing a loop circuit current path about said first conductor, said second conductor having a higher transition field than the transition field of said first conductor, a third conductor for providing a current path about at least a portion of said first conductor, and circuit coupling means connected to said first conductor whereby the presence of resistance therein is ascertained for detecting circulating current in said loop circuit current path.

2. The cryogenic device as defined in claim 1 wherein said first and said second conductors are concentric cylinders, and said third conductor is a winding around said cylinders.

3. The cryogenic device as defined in claim 1 wherein the material of said third conductor is resistive.

4. A bistable electronic circuit comprising first and second cryogenic electronic devices each comprising a first conductor of superconducting material, a second conductor of superconducting material for providing a current path about said first conductor, said second conductor having a higher transition field than the transition field of said first conductor, and a third conductor for providing a current path about said first conductor; leads for connecting in series said third conductor of said first cryogenic electronic device and said second conductor of said second cryogenic electronic device; leads for connecting in series said third conductor of said second cryogenic electronic device and said second conductor of said first cryogenic electronic device; and leads for connecting in series said first conductors of said first and second cryogenic electronic devices.

5. The bistable electronic circuit as defined in claim 4 wherein one of said first and second cryogenic electronic devices, said first and second conductors comprise concentric cylinders, and said third conductor is a winding around said concentric cylinders.

6. A circuit comprising a first conductor of superconducting material, a second conductor of superconducting material for providing a current path about said first conductor, the material of said second conductor having a higher transition field than the material of said first conductor, a third conductor for providing a current path about said first conductor, means for providing a current pulse in said third conductor that produces a magnetic field greater than the transition fields of said first and second conductors, and means for dissipating at selectable times the currents induced in said second conductor by the decay of said field at the termination of said current pulse.

7. The circuit as defined in claim 6 wherein said first and second conductors are inner and outer concentric cylinders, respectively, and said means for dissipating the induced currents comprises means for producing a longitudinal current flow in said outer cylinder which in turn produces a magnetic field greater in magnitude than the transition field of said outer cylinder.

8. A cryogenic electronic device circuit comprising a first conductor of superconducting material, means for momentarily applying a first magnetic field that restores the resistance to said conductor, means including a second conductor of superconducting material in a closed circuit and magnetically coupled to said first conductor, said last mentioned means being responsive to said first magnetic field to produce a current in said closed circuit for producing a second magnetic field for maintaining said first conductor resistive without itself remaining resistive, and means for interrupting at a selectable time said second magnetic field.

9. A cryogenic electronic device circuit comprising a conductor of superconducting material exhibiting a predetermined critical field, means for momentarily applying a first magnetic field that restores the resistance to said conductor, means including material exhibiting a higher critical field, said latter means being responsive to the termination of said first magnetic field for producing a superconducting current flow that produces a second magnetic field for maintaining said conductor resistive, and means for dissipating said current flow at a selectable time.

10. A cryogenic electronic device comprising a closed loop circuit superconductor adapted to lose electrical resistance when lowered to a temperature near absolute zero for supporting a persistent current therethrough; said loop including superconducting material exhibiting the characteristic of regaining resistance in the presence of a first predetermined magnetic field but not at the instance of current flowing therethrough equal in value to the persistent current; magnetic field producing means for selectably subjecting said material to a field at least equaling said first predetermined magnetic field; and a second superconductor provided with connections and having the characteristic of becoming resistive in a field not greater in magnitude than a magnetic field which is produced by the said persistent current; wherein said second superconductor is positioned in the last mentioned field produced by said persistent current so that said persistent current is continuously detected by means of detecting the resistance which is established in said second superconductor.

11. A cryogenic electronic device comprising a closed superconductive loop circuit capable of supporting a persistent loop current, said loop circuit including material exhibiting a given transition field, a second superconductor positioned in a magnetic field produced by said persistent loop current, said second superconductor having a transition field less than the said magnetic field produced by said loop current, and a magnetic means for producing in the vicinity of said material a magnetic field greater than said given transition field.

12. A cryogenic electronic device comprising a closed loop of superconducting material capable of supporting a persistent loop current, at least a portion of said loop exhibiting a first transition field, a second superconductor provided with end conductors and positioned in a magnetic field produced by said persistent loop current, said second superconductor having a transition field less than the said magnetic field produced by said loop current, and a magnetic means for subjecting said portion to a magnetic field greater than said first transition field.

References Cited in the file of this patent

UNITED STATES PATENTS

| | | |
|---|---|---|
| 2,666,884 | Ericsson et al. | Jan. 19, 1954 |
| 2,832,897 | Buck | Apr. 29, 1958 |
| 2,877,448 | Nyberg | Mar. 10, 1959 |
| 2,888,201 | Housman | May 26, 1959 |
| 2,936,435 | Buck | May 10, 1960 |